(12) United States Patent
Vrana

(10) Patent No.: US 6,442,830 B1
(45) Date of Patent: Sep. 3, 2002

(54) FASTENER INSTALLATION ASSEMBLY

(75) Inventor: John J. Vrana, Rochester Hills, MI (US)

(73) Assignee: Fabristeel Products, Taylor, MI (US)

( * ) Notice: Subject to any disclaimer, the term of this patent is extended or adjusted under 35 U.S.C. 154(b) by 0 days.

(21) Appl. No.: 09/652,244

(22) Filed: Aug. 31, 2000

Related U.S. Application Data

(60) Provisional application No. 60/151,567, filed on Aug. 31, 1999.

(51) Int. Cl.$^7$ ................................................ B25B 27/00
(52) U.S. Cl. ............................. 29/715; 29/716; 29/798; 29/243.5
(58) Field of Search ............................. 29/432.1, 432.2, 29/465, 243.5, 243.53, 715, 716, 798, 243.517, 509, 525.01, 525.05, 525.06, 525.08; 227/110, 111, 56

(56) References Cited

U.S. PATENT DOCUMENTS

| | | |
|---|---|---|
| 4,384,667 A | 5/1983 | Smallegan et al. |
| 4,505,416 A | 3/1985 | Smallegan |
| 4,785,529 A | 11/1988 | Pamer et al. |
| 5,072,518 A | 12/1991 | Scott |
| 5,146,672 A | 9/1992 | Muller |
| 5,214,837 A | 6/1993 | Stafford |
| 5,566,446 A | 10/1996 | Luckhardt et al. |

FOREIGN PATENT DOCUMENTS

DE          4237621 A1 * 8/1993 .............. 29/243.53

* cited by examiner

Primary Examiner—David P. Bryant
Assistant Examiner—Jermie E. Cozart
(74) Attorney, Agent, or Firm—Howard & Howard

(57) ABSTRACT

A fastener installation assembly having a base, a first support member mounted to the base to slide upon the base and a second support member mounted to the first support member to the slide upon the first support member. The first and second support members have opposed engagement surfaces, one of the engagement surfaces has a stationary member and a moveable member mounted thereon and the other engagement surface has a die member mounted thereon. The fastener installation assembly has first and second power cylinders, the first power cylinder is operatively coupled to the first support member and the second power cylinder is operatively connected to the second support member the power cylinders move the engagement surfaces together to install a fastener into a panel. The moveable member is mounted proximate the stationary member and moveable relative to the stationary member, the moveable member includes a shank extending into the stationary member to guide the moveable member with respect to the stationary member. Keepers are mounted relative to the moveable member to retain the moveable member with respect to the stationary member and allow the moveable member to move with respect to the stationary member and to cooperate with the shank to guide the moveable member with respect to the stationary member.

44 Claims, 4 Drawing Sheets

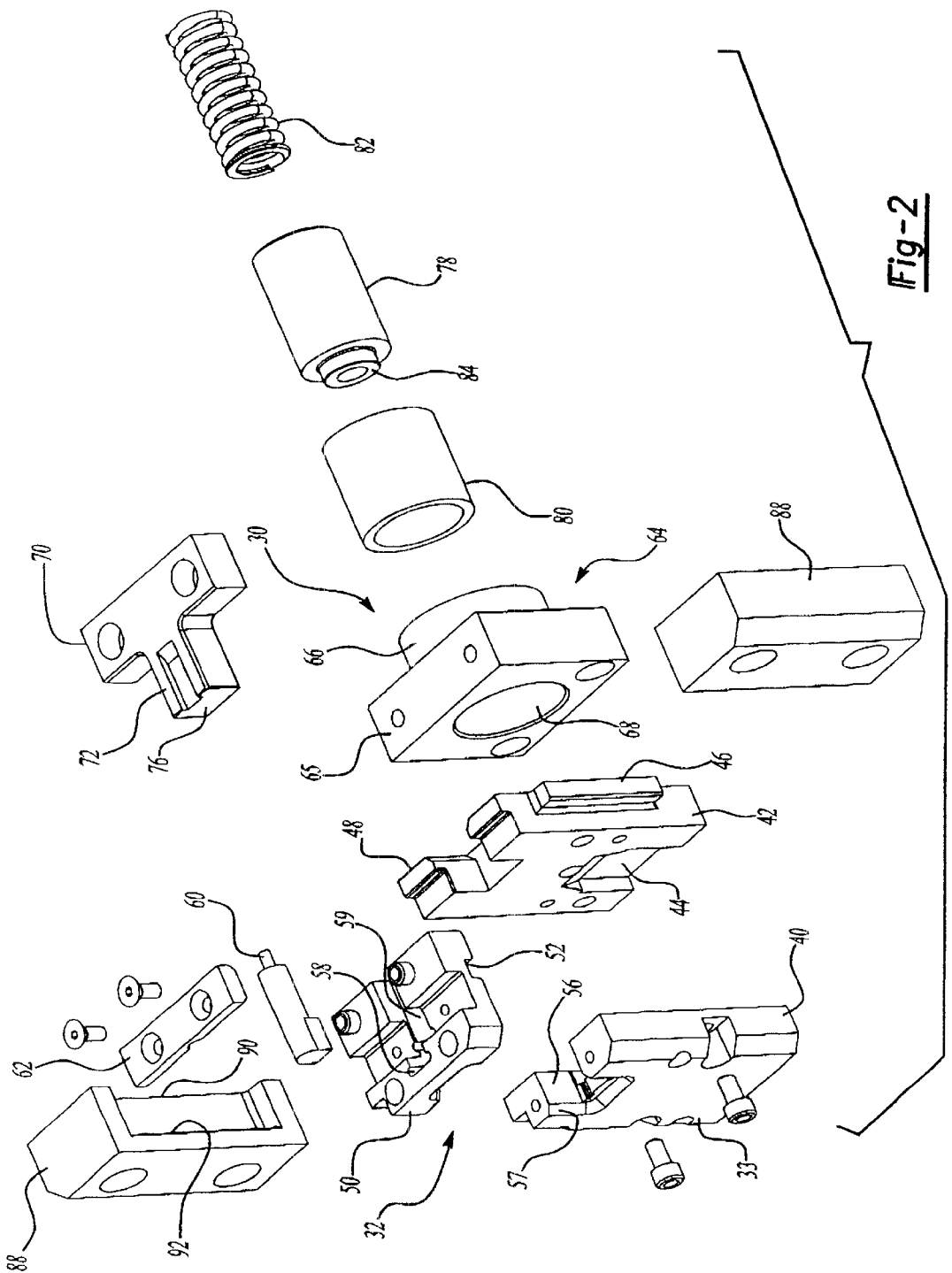

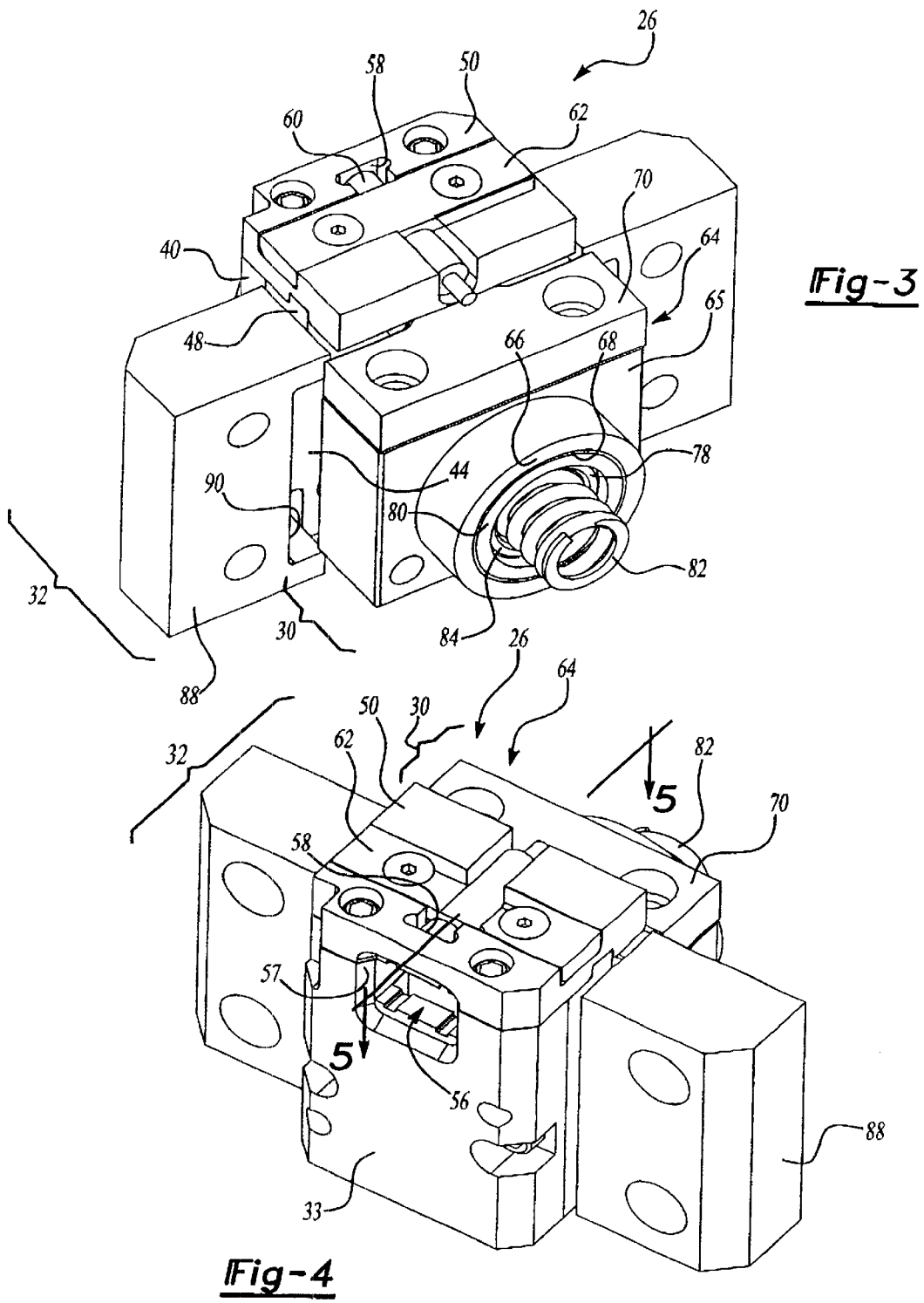

FASTENER INSTALLATION ASSEMBLY

This application claims priority to U.S. Provisional application, Ser. No. 60/151,567 filed Aug. 31, 1999.

BACKGROUND OF THE INVENTION

This invention relates to head unit for a press that is used to install pierce nuts onto a panel. The head unit of the present invention provides an improved mechanism for ensuring precise relative movement between the stationary and movable members while providing an inexpensive and simple mechanism which facilitates replacing worn head unit components.

Prior art head units typically utilized a pair of guide pins, or shoulder screws to ensure that the movable and stationary members were properly aligned and to retain the movable member as the spring biased the movable member away from the stationary member. The guide pins were received in bores in the movable member and threaded into the stationary member. One such head unit is disclosed in U.S. Pat. No. 4,505,416 issued on Mar. 19, 1985 to the assignee of this application.

In the prior art, undesired play occurred as the guide pins and bores began to wear. Unfortunately, replacing the guide pins was not sufficient and the bores also required repair, resulting in costly repairs and lengthy downtime of the press. For example, the bores were typically repaired by welding them and then drilling the bores to the desired diameter so that the same size guide pins could be used. Alternatively, the bores were drilled to a larger diameter so that oversized guide pins could be used. Both of these repairs were undesirably time consuming and costly.

BRIEF DESCRIPTION OF THE DRAWINGS

Other advantages of the present invention can be understood by reference to the following detailed description when considered in connection with the accompanying drawings wherein:

FIG. 2 is an exploded perspective view of a head unit of the present invention;

FIG. 3 is a rear perspective view of the head unit depicted in FIG. 2 assembled;

FIG. 4 is a front perspective view of the head unit depicted in FIG. 2 assembled.

DETAILED DESCRIPTION OF THE PREFERRED EMBODIMENT

Figure 1:
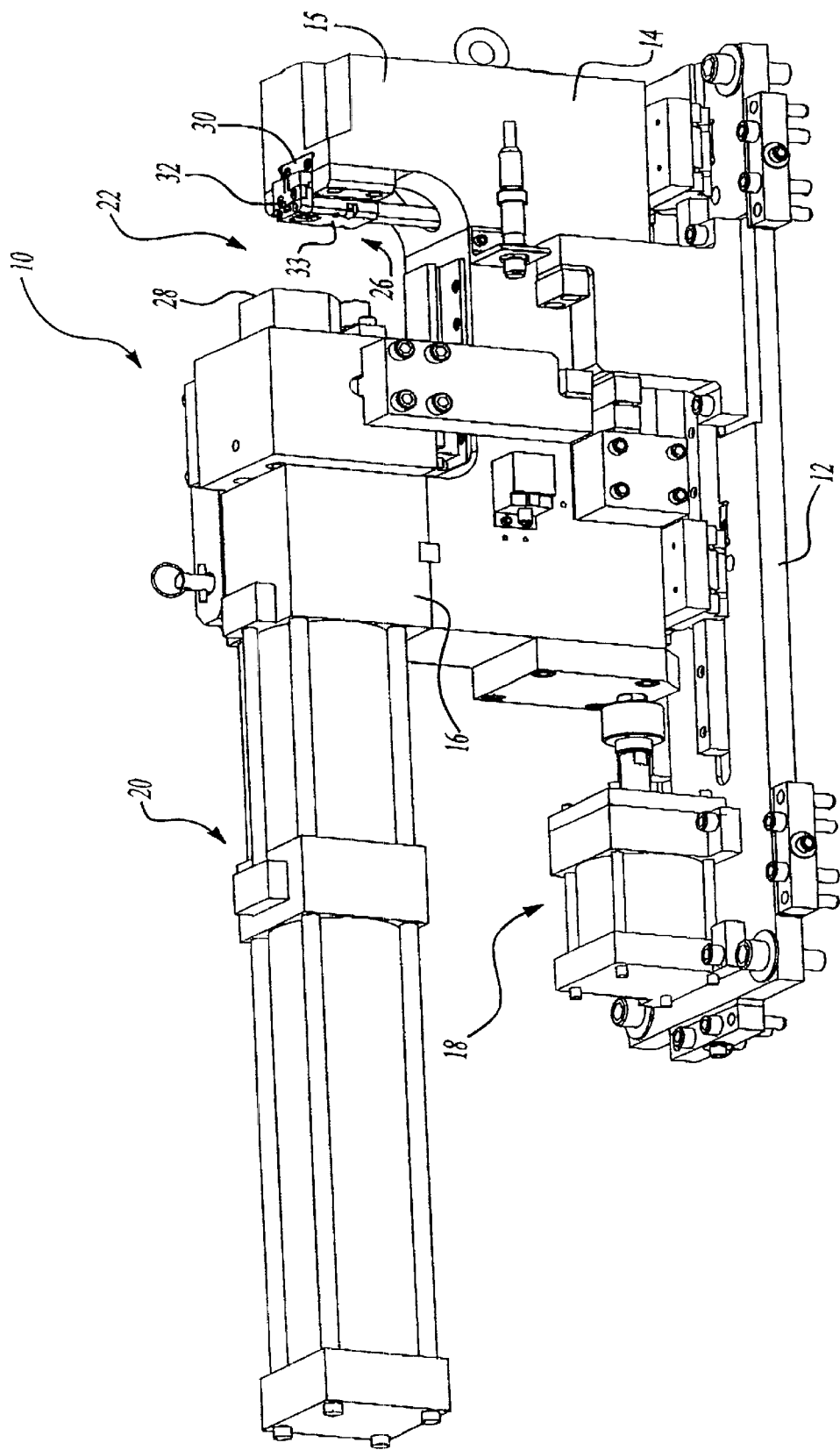
FIG. 1 is a perspective view of a press used for installing pierce nuts onto a panel.
Figure 5:
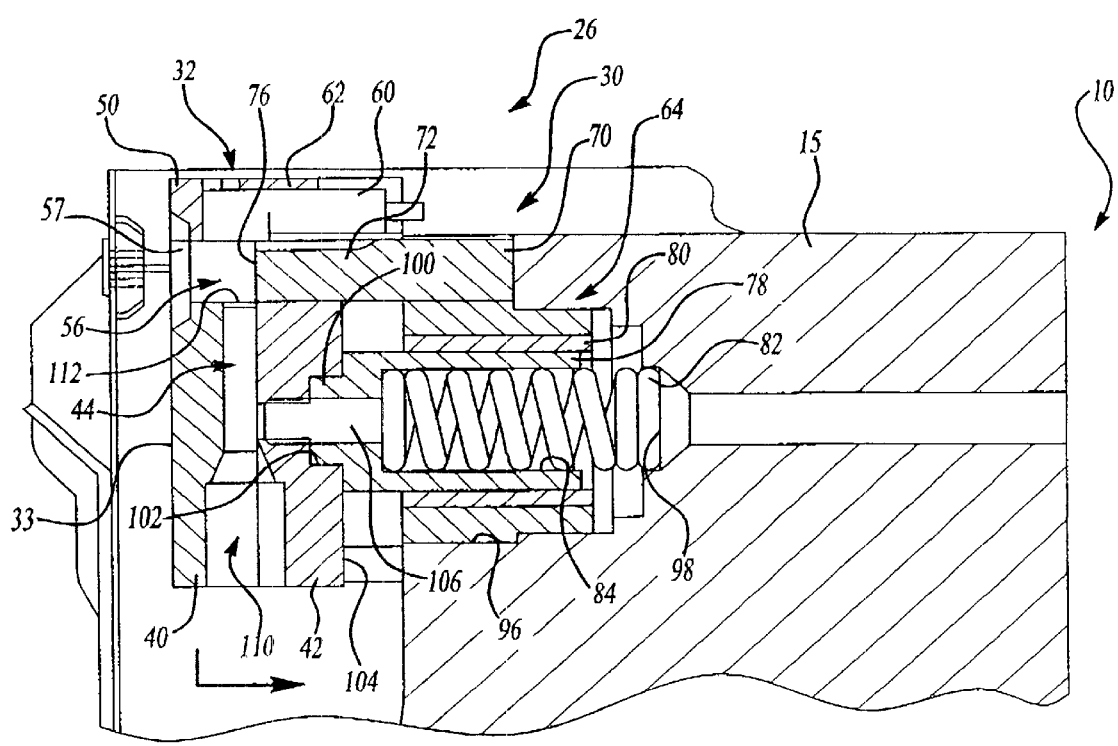
FIG. 5 is a cross-sectional view of the head unit taken along line 5—5 in FIG. 4.

A press 10 for installing fasteners (not shown) onto a panel (not shown) is shown in FIG. 1. Press 10 has a base 12 to which a first support member 14 is attached. The first support member 14 has an arm 15 extending from one portion of the first support member 14 and a second support member 16 slidably supported on an adjacent portion of the first support member 14. A first cylinder 18 is connected between the base 12 and the second support member 16 such that the second support member 16 will slide relative to the first member. A second cylinder 20 is supported on the second support member 16 opposite the arm 15, which together define a work area 22.

A head unit 26 is attached to the arm 15 opposite the second cylinder 20. The second cylinder 20 has a movable end 28 with a die for forming the panel during the pressing operation. During the pressing operation, a panel is loaded into the work area 22 between the movable die end 28 and the head unit 26 for installation of a fastener, such as a pierce nut, into the panel. The first cylinder 18 is actuated to the retracted position while the second cylinder 20 is initially in the retracted position, which is shown in FIG. 1. This brings the arm 15 towards the end 28 which partially closes the area 22 and brings arm 15 to the panel. The second cylinder 20 is actuated and engages the panel with the die end 28 and forces the panel against the head unit 26. A pierce nut, which is located within the head unit 26, is forced into the panel by the action of the second cylinder 20. When the second cylinder 20 reaches a predetermined load, it overcomes the first cylinder 18 and forces the second support member 16 to slide relative to the first support member 14. In the preferred embodiment, the cylinder 18 is about 886 lbs. And the cylinder 20 is about 15 tons.

The head unit 26 has a stationary member 30 that is secured to the arm 15 and a movable member 32 that is movable relative to the stationary member 30. A resilient member (not shown in FIG. 1) is interposed between the movable member 32 and either the stationary member 30 or the arm 15 to bias the movable member 32 away from the stationary member 30 and toward the die end 28. A pierce nut is interposed between the stationary member and the panel. As the second cylinder 20 forces the panel against a face 33 of the movable member 32, the resilient member is compressed and the pierce nut is installed into the panel by the stationary member 30.

Referring to FIG. 2, the head unit 26 is shown disassembled. The movable member 32 includes a body 40 that is fastened to a nut cap 42 to define an nut passage 44 for receiving the pierce nuts. The nut cap 42 has opposing outwardly extending tabs 46 and a flange 48. A nose plate 50 is fastened to the body 40 and nut cap 42 and has a groove 52 that receives the flange 48 to lock the body 40, nut cap 42, and nose plate 50 securely together. The body 40, nut cap 42, and nose plate 50 define a plunger passage 56 that runs transverse to the nut passage 44 through the nut cap 42 and body 40 to the face 33 forming an opening 57.

The nose plate 50 has an opening 58 intersecting the plunger passage 56 and a contoured surface adapted to receive a proximitor probe 60. The proximitor probe 60 is secured to the nose plate 50 adjacent to the plunger passage 56 by a proximitor plate 62 to determine when a nut is present in the plunger passage 56.

The stationary member 30 includes a housing 64 that is secured to the arm 15. The housing 64 has a square portion 64 and a cylindrical portion 66 extending therefrom with a bore 68 extending therethrough. A T-shaped plunger 70 is fastened to the square portion 64 of the housing 64 parallel to the bore 68. The plunger 70 has a leg 72 with an engagement surface 76 for engaging the nuts during the pressing operation. The leg 72 is slidably disposed within the plunger passage 56 so that when the movable member 32 moves relative to the stationary member 30, the plunger 70 will force the pierce nut out of the plunger passage 56, through the opening 57, and into the panel.

A shank 78 is secured to the movable member 32 and disposed within the bore 68. A standard sized bushing 80 is interposed between the shank 78 and movable member 32 to provide a bearing surface between the movable member 32 and the stationary member 30 during relative movement between the members 30,32. A resilient member, or spring 82, is received within an opening 84 in the shank 78. The spring 82 is arranged between the movable member 32 and the arm 15. Prior art devices positioned the spring between the movable member and a back-up plate that was secured to the stationary member on the side opposite the movable member.

A pair of keepers 88 is fastened to the arm 15 on opposing sides of the movable member 32. Each keeper 88 has a rectangular pocket 90 that receives a tab 46. The spring 82 biases the tabs 46 of the movable member 32 against a forward surface 92 of the pockets 90. The pockets 90 are large enough to permit the movable member 32 to travel a sufficient distance relative to the stationary member 30 so that the plunger 70 may install the nut into the panel. The tabs 46 and keepers 88 function together limit the travel of the movable member 32 relative to the stationary member 30, thereby replacing the travel limiting function of the guide pins in the prior art.

The shank 78, bushing 80, and housing 64 coact with one another to ensure that the plunger 70 is positioned properly relative to the pierce nut during the pressing operation. Together they operate to replace the guide pins of the prior art. With the present invention, the bushing 80 wears over time as the movable member 32 moves relative to the stationary member 30. To replace the bushing 80, the keepers 88 are simply removed from the arm 15, which permits removal of the rest of the head unit 26 and access to the bushing 80, as best shown in FIG. 3.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A fastener installation assembly for use with a press comprising:
    a stationary member for attachment to the press; said stationary member having a plunger attached
    a moveable member proximate said stationary member and moveable relative to said stationary member, said moveable member including a shank extending into said stationary member to guide said moveable member with respect to said stationary member;
    a fastener passage formed in said moveable member to receive and guide fasteners to a plunger passage; said plunger extending into said plunger passage when said moveable member moves with respect to said stationary member, said plunger moving transverse to said fastener passage;
    keepers mounted relative to said moveable member to retain said moveable member with respect to said stationary member and allow said movable member to move with respect to said stationary member and to cooperate with said shank to guide said moveable member with respect to said stationary member;
    moveable member including tabs extending outwardly from opposed sides of said moveable member and said keepers include pockets for receipt of said tabs, said keeper and tabs cooperating to limit the travel of said moveable member and allo said moveable member to move a sufficient predetermined distance.

2. The fastener installation assembly of claim 1, further including a spring engaging said shank to normally bias said moveable member away from said stationary member.

3. The fastener installation assembly of claim 1, wherein said plunger is generally t-shaped having a leg with an engagement surface for engaging fasteners in said plunger passage.

4. The fastener installation assembly of claim 1, wherein said stationary member includes a block having a bore extending through it for receipt of said shank for reciprocation with said bore.

5. The fastener installation assembly of claim 4, wherein said stationary member includes a bushing inserted into said bore with said shank received within said bushing for reciprocation within said bushing.

6. The fastener installation assembly of claim 5, wherein said bushing is made of brass.

7. The fastener installation assembly of claim 5, wherein said bushing is a standard size.

8. The fastener installation assembly of claim 1, wherein said moveable member includes a nose plate fastened to a nose body defining said fastener passage.

9. The fastener installation assembly of claim 8, wherein said moveable member includes a cover plate for securing said nose plate to said body plate, said cover plate and said nose plate having apertures for receipt of connectors to secure said cover plate to said nose plate, and said nose body has a flange and said cover plate has a groove for receipt of said flange so that when said cover plate is secured to said nose plate said nose body is secured to said nose plate.

10. The fastener installation assembly of claim 1, further including a proximity switch mounted to said cover plate, said proximity switch adapted to determine the location of a fastener in said plunger passage.

11. The fastener installation assembly of claim 1, wherein said shank is connected to said moveable member by a bolt.

12. The fastener instllation assembly of claim 1, further including a press with said fastener installation assembly being mounted to said press.

13. The fastener installation assembly of claim 12, wherein said press has a base, a first support member mounted to said base to slide upon said base and a second support member mounted to said first support member to slide upon said first support member, said first and second support members have opposed engagement surfaces, one of said engagement surfaces having said stationary and moveable member mounted thereon and said other engagement surface having a die member mounted thereon.

14. The fastener installation assembly of claim 13, further including power cylinders, one of said power cylinders is operatively coupled to said first support member and the other power cylinder is operatively connected to said second support member said power cylinders moving said engagement surfaces together to install a fastener into a panel.

15. A fastener installation assembly comprising:
    a base, a first support member mounted to said base to slide upon said base and a second support member mounted to said first support member to slide upon said first support member, said first and second support members have opposed engagement surfaces, one of said engagement surfaces having a stationary and a moveable member mounted thereon and said other engagement surface having a die member mounted thereon;
    first and second power cylinders, said first power cylinder is operatively coupled to said first support member, said second power cylinder is operatively connected to said second support member, said power cylinders moving said engagement surfaces together to install a fastener into a panel;

said first power cylinder having a final pressure that is less than the final pressure of said second power cylinder such that when the final pressure of the second cylinder exceeds the final pressure of the first cylinder, the first cylinder is forced to retract and causes the second support member to slide relative to the first support member permitting removal of said panel to maintain a predetermined pressing force.

16. The fastener installation assembly of claim 15, wherein said stationary member includes a plunger;
said moveable member is mounted proximate said stationary member and moveable relative to said stationary member, said moveable member including a shank extending into said stationary member to guide said moveable member with respect to said stationary member;
a fastener passage formed in said moveable member to receive and guide fasteners to a plunger passage; said plunger extending into said plunger passage when said moveable member moves with respect to said stationary member, said plunger moving transverse to said fastener passage;
keepers mounted relative to said moveable member to retain said moveable member with respect to said stationary member and allow said moveable member to move with respect to said stationary member and to cooperate with said shank to guide said moveable member with respect to said stationary member.

17. The fastener installation assembly of claim 16, wherein said moveable member includes tabs extending outwardly from opposed sides of said moveable member and said keepers include pockets for receipt of said tabs, said keeper and tabs cooperating to limit the travel of s aid moveable member and allow said moveable member to move a sufficient predetermined distance.

18. The fastener installation assembly of claim 17, wherein said plunger is generally t-shaped having a leg with an engagement surface for engaging fasteners in said plunger passage.

19. The fastener installation assembly of claim 17, wherein said stationary member includes a bushing inserted into said bore with said shank received within said bushing for reciprocation within said bushing.

20. A fastener installation assembly for use with a press comprising:
a stationary member for attachment to the press; said stationary member having a plunger attached;
a moveable member proximate said stationary member and moveable relative to said stationary member, said moveable member including a shank extending into said stationary member to guide said moveable member with respect to said stationary member;
a fastener passage formed in said moveable member to receive and guide fasteners to a plunger passage; said plunger extending into said plunger passage when said moveable member moves with respect to said stationary member, said plunger moving transverse to said fastener passage;
keepers mounted relative to said moveable member to retain said moveable member with respect to said stationary member and allow said moveable member to move with respect to said stationary member and to cooperate with said shank to guide said moveable member with respect to said stationary member;
said stationary member includes a block having a bore extending through it for receipt of said shank for reciprocation with said bore;
said stationary member includes a bushing inserted into said bore with said shank received within said bushing for reciprocation within said bushing.

21. The fastener installation assembly of claim 20, further including a spring engaging said shank to normally bias said moveable member away from said stationary member.

22. The fastener installation assembly of claim 20, wherein said moveable member includes tabs extending outwardly from opposed sides of said moveable member and said keepers include pockets for receipt of said tabs, said keeper and tabs cooperating to limit the travel of said moveable member and allow said moveable member to move a sufficient predetermined distance.

23. The fastener installation assembly of claim 20, wherein said bushing is made of brass.

24. The fastener installation assembly of claim 20, wherein said bushing is a standard size.

25. The fastener installation assembly of claim 20, wherein said moveable member includes a nose plate fastened to a nose body defining said fastener passage.

26. The fastener installation assembly of claim 25, wherein said moveable member includes a cover plate for securing said nose palte to said body plate, said cover plate and said nose plate having apertures for receipt of connectors to secure said cover palte to said nose plate, and said nose body has a flange and said cover plate has a groove for receive of said flange so that when said cover plate is secured to said nose p said nose body is secured to said nose plate.

27. The fastener installation assembly of claim 20, further including a proximity switch mounted to said cover plate, said proximity switch adapted to determine the location of a fastener in said plunger passage.

28. The fastener installation assembly of claim 20, wherein said shank is connected to said moveable member by a bolt.

29. The fastener installation assembly of claim 20, further including a press with said fastener installation assembly being mounted to said press.

30. The fastener installation assembly of claim 29, wherein said press has a base, a first support member mounted to said base to slide upon said base and a second support member mounted to said first support member to slide upon said first support member, said first and second support members have opposed engagement surfaces, one of said engagement surfaces having said stationary and moveable member mounted thereon and said other engagement surface having a die member mounted thereon.

31. The fastener installation assembly of claim 30, further including power cylinders, one of said power cylinders is operatively coupled to said first member and the other power cylinder is operatively connected to said second power cylinder, said power cylinders moving said engagement surfaces together to install a fastener into a panel.

32. A fastener installation assembly for use with a press comprising:
a stationary member for attachment to the press; said stationary member having a plunger attached;
a movable member proximate said stationary member and moveable relative to said stationary member, said moveable member including a shank extending into said stationary member to guide said moveable member with respect to said stationary member;
a fastener passage formed in said moveable member to receive and guide fasteners to a plunger passage; said plunger extending into said plunger passage when said moveable member moves with respect to said stationary member, said plunger moving transverse to said fastener passage;

keepers mounted relative to said moveable member to retain said moveable member with respect to said stationary member and allow said moveable member to move with respect to said stationary member and to cooperate with said shank to guide said moveable member with respect to said stationary member;

a press with said fastener installation assembly being mounted to said press;

said press has a base, a first support member mounted to said base to slide upon said base and a second support member mounted to said first support member to slide upon said first support member, said first and second support members have opposed engagement surfaces, one of said engagement surfaces having said stationary and moveable member mounted thereon and said other engagement surface having a die member mounted thereon.

33. The fastener installation assembly of claim 32, further including a spring engaging said to normally bias said moveable member away from said stationary member.

34. The faster installation assembly of claim 32, wherein said moveable member includes tabs extending outwardly from opposed sides of said moveable member and said keepers include pockets for receipt of said tabs, said keeper tabs cooperating to limit the travel of said moveable member and allow said moveable member to move a sufficient predetermined distance.

35. The fastener installation assembly of claim 32, wherein said plunger is generally t-shaped having a leg with an engagement surface for engaging fasteners in said plunger passage.

36. The fastener installation assembly of claim 32, wherein said stationary member includes a block having a bore extending through it for receipt to said shank for reciprocation with said bore.

37. The fastener installation assembly of claim 36, wherein said stationary member includes a bushing inserted into said bore with said shank received within said bushing for reciprocation within said bushing.

38. The fastener installation assembly of claim 37, wherein said bushing is made of brass.

39. The fastener installation assembly of claim 36, wherein said bushing is a standard size.

40. The fastener installation assembly of claim 32, further including a proximity switch mounted to said cover plate, said proximity switch adapted to determine the location of a fastener in said plunger passage.

41. The fastener installation assembly of claim 32, wherein said shank is connected to said moveable member by a bolt.

42. The fastener installation assembly of claim 32, further including a press with said fastener installation assembly being mounted to said press.

43. The fastener installation assembly of claim 42, wherein said press has a base, a first support member mounted to said base to slide upon said base and a second support member mounted to said first support member to slide upon said first support member, said first and second support members have opposed engagement surfaces, one of said engagement surfaces having said stationary and moveable member mounted thereon and said other engagement surface having a die member mounted thereon.

44. The fastener installation assembly of claim 43, further including power cylinders, one of said power cylinders is operatively coupled to said first support member and the other power cylinder is operatively connected to said second support member said power cylinders moving said engagement surfaces together to installation fastener into a panel.

\* \* \* \* \*